Patented Oct. 28, 1947

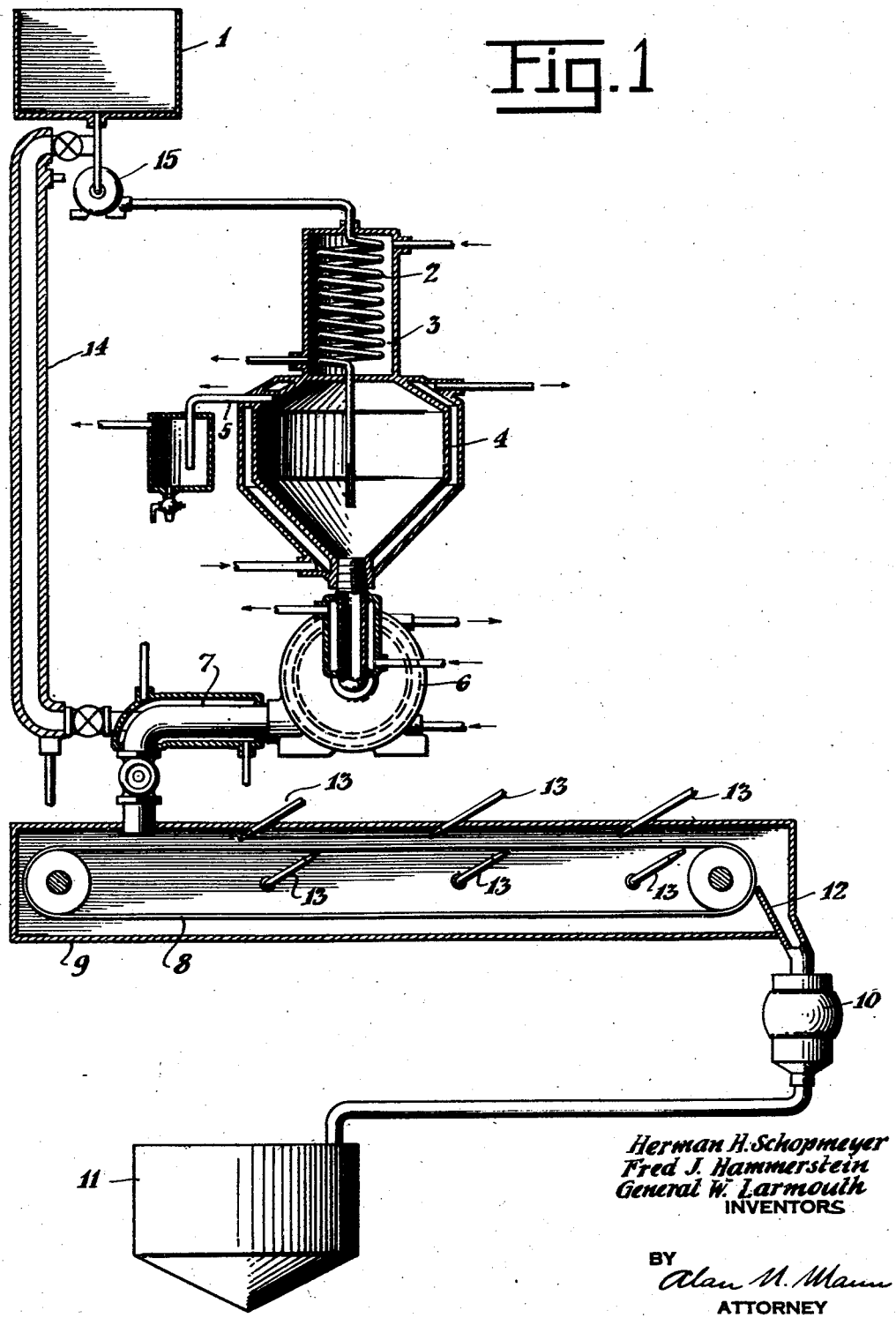

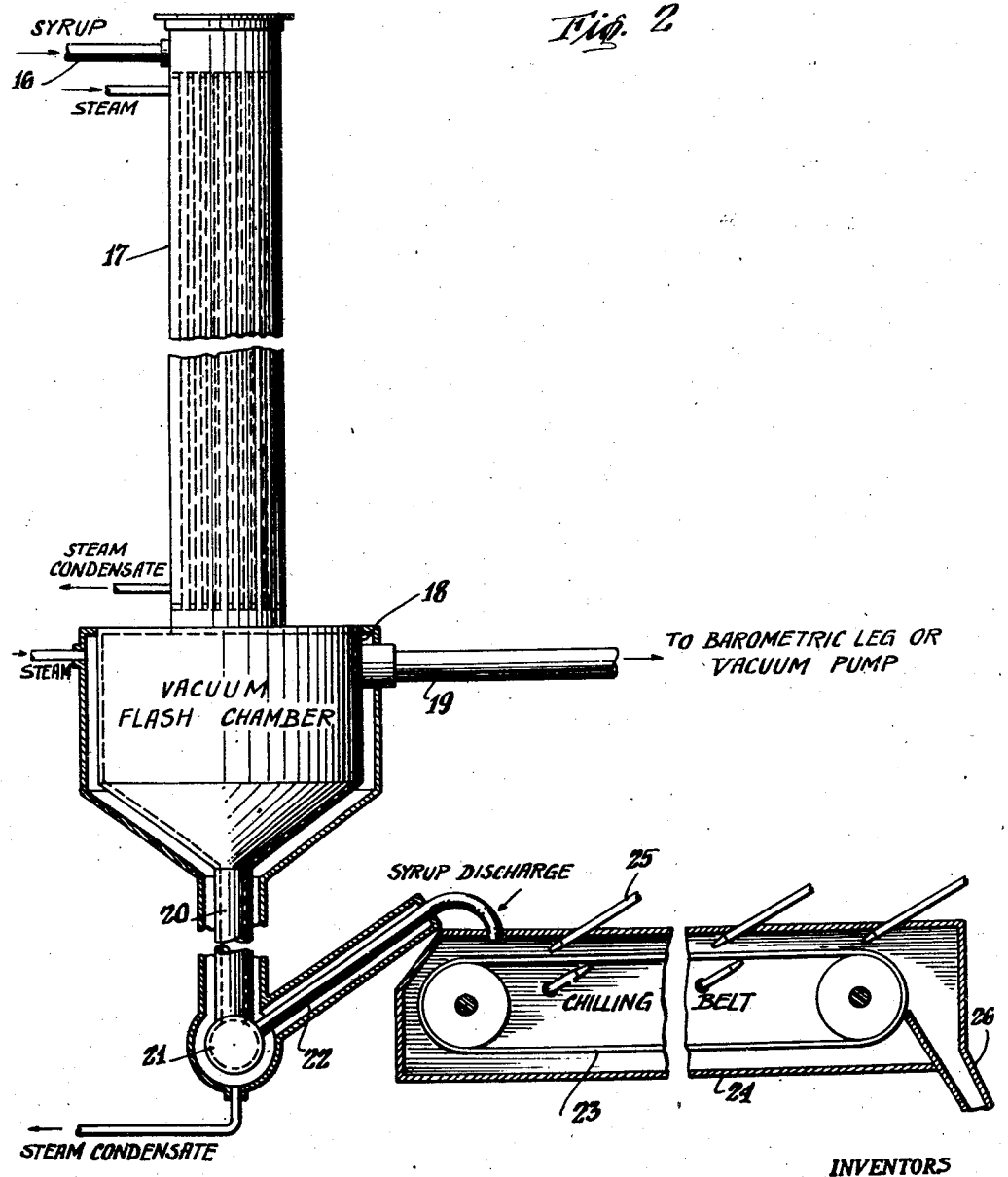

2,429,964

UNITED STATES PATENT OFFICE 2,429,964

METHOD FOR DEWATERING STARCH CONVERSION SYRUP

Herman H. Schopmeyer, Hammond, Ind., and Fred J. Hammerstein and General W. Larmouth, Chicago, Ill., assignors to American Maize-Products Company, a corporation of Maine Application February 24, 1945, Serial No. 579,514

4 Claims. (Cl. 127—34)

This invention relates to a method for dewatering starch conversion syrup and particularly to the production of a dried homogeneous starch conversion product of low moisture content, without the development of objectionable discoloration and flavor.

This application is a continuation-in-part of our earlier application Ser. No. 387,576, filed on April 9, 1941, for Method of dewatering starch conversion syrup.

For the preparation of starch conversion syrup solids in solid form, there is known a method which includes conducting the final evaporation of a batch of the syrup in a vacuum evaporator until the moisture content is lowered to about 2 to 3 per cent, after which evaporation the vacuum is broken and the thus dewatered syrup is flowed from the kettle into pans where the product cools and solidifies.

Even when great care is exercised to avoid heating the syrup at too high a temperature and the temperature is maintained at all times below 220° F., there is caramelization and discoloration to an objectionable extent and development of a flavor which is described as malt-like, this flavor presumably being produced in part by the reaction of sugars and proteins which are present in the syrup during the evaporation.

We have now discovered that the concentration of the syrup may be effected at a much higher temperature than that used heretofore, with an actual decrease in the discoloration, caramelization, and development of malt-like flavor, by bringing the syrup for a very short period of time only into contact with a heated surface and forcing the syrup over the said surface at high speed so as to avoid any accumulation of slow moving or stagnant material on the said surface.

The invention comprises the particular method of carrying out this process. In the preferred embodiment the liquor is first heated to a temperature of between 180° and 220° F. to drive off some water to produce a syrup having a denisty not less than 30° Bé. and not above that density at which the liquor may be pumped when warm. The liquor is then caused to flow rapidly through one or more heated pipes so as to raise the temperature of the syrup to about 250° to 350° F. The thus treated syrup is discharged continuously into an evacuated chamber so that quick evaporation of water from the heated syrup occurs and the vacuum should be maintained low enough so that the water content is lowered to approximately 4% or lower. This material will solidify rapidly when cooled but the temperature is maintained high enough so that the liquor will still flow in molten condition. The molten liquid is withdrawn from the evacuated chamber and then cooled rapidly, preferably while in motion, so that the operation may be carried on as a continuous one. The cooling may be effected by contacting the syrup with cold air of low relative humidity.

The material produced according to the invention is very light in color, as compared to the usual corn syrup solids made by batch evaporation to approximately the final moisture content desired, is homogeneous, and contains about 1 to 4 per cent and usually less than 2.5 per cent of water.

Apparatus suitable for use in the present invention is shown in the drawing forming a part of this specification.

A typical example of the practice of the invention will be described in connection with the drawing.

Fig. 1 is a side view that is largely in section and in part diagrammatic of a suitable form of apparatus for carrying out the method of the present invention.

Fig. 2 is a similar view of a somewhat modified apparatus embodying the same features as the other apparatus and utilizing in its operation the same principles. This apparatus differs from that of Fig. 1 primarily in the replacement of the heat exchanger of Fig. 1 by a conventional widely used type of exchanger.

Corn syrup of density of about 42° Bé. or higher but not above the concentration at which the syrup may be pumped is heated in an open container 1 to a moderately elevated temperature, say, about 180 to 220° F., and then pumped rapidly with a positive pressure pump through a metal coil 2 disposed within the steam chamber 3 in which there is maintained steam at about 80 pounds or so pressure. The pipe 2 is of rather small diameter and so proportioned that, under 100 pounds' pressure, the syrup will pass rapidly through the coil, as, for example, at a linear speed of at least 15 feet per second and preferably 20 to 40 feet per second. We have used such a coil and speed of passage of the syrup therethrough that the syrup issues from the lower end of the coil at a temperature above the 220° F. heretofore used and advantageously within the range of 250° to 350° F. Steam is generated rapidly within the coil.

The heated syrup issuing from the outlet of the steam coil 2 falls into an evacuated chamber 4 that is in direct communication with the coil, may be hopper-shaped in its lower part, and is provided with an outlet 5 attached to a vacuum pump (not shown) and a bottom discharge. The chamber 4 is kept highly evacuated as, for example, to a pressure corresponding to not more than a few inches of mercury, say, to 5 inches or so and suitably to 3 inches or less.

The highly heated liquor, as it passes within the tube and enters the evacuated chamber, undergoes sudden evaporation of water with attendant decrease in moisture content. As a result largely of the evaporation, the syrup is cooled in the evacuated chamber, as, for example, to about 220° F., the exact temperature depending largely upon the pressure within the chamber but being maintained above the flowing point of the dewatered material, so as to prevent sticking of the material on the wall of the container.

Under the influence of the vacuum in chamber 4, the steam generated in the coil is expanded, particularly towards the outlet end of the tube, and its large volume sweeping through the tube assists in avoiding sticking of the now highly heated syrup to the walls of the tube. Furthermore, generation of the steam increases the rate of movement of the syrup through the tube, so that there is only flash heating of the syrup, followed promptly by sudden cooling in the chamber 4.

The dewatered material which collects near the bottom of the chamber 4 is a viscous but flowable liquid mass. It is delivered by pump 6 through pipe 7 to a moving surface, as, for example, to the upper reach of the conveyor belt 8. The conveyor belt is partially or largely enclosed within the casing 9 and cold air of low relative humidity is blown through inlets 13 into the casing, so that the non-volatile material is contacted with a stream of the cold air and further cooled without absorption of appreciable water, the air used escaping through an opening (not shown) in the casing 9. When the material delivered to the conveyor belt runs about 2 or 3 per cent or less of water, then the product solidifies on the conveyor belt.

When the product has solidified, it is delivered in any convenient manner as to mill 10 and then to the receiver or hopper 11 for milled material, member 12 being used to assist in scraping the material from the belt or deflecting it to the mill.

The product so made and then redissolved, to form a corn syrup of the density originally supplied to container 1, has approximately the same color as that of the original corn syrup. The flavor also is good and characteristic of undried corn syrup.

In place of the corn syrup there may be substituted syrup made by converting potato, tapioca, or like starch.

Conditions of operation may be varied within limits. It is necessary, however, that the heated surface illustrated by coil 2 be maintained at a temperature somewhat above that at which the syrup is to be heated so that, even when the syrup passes as an extremely rapid stream over the said surface, the syrup is raised to the desired elevated temperature. The temperature to which the syrup is heated in the coil must be far above that to which the product is cooled under the influence of evacuation, so that the loss of heat during the cooling will be adequate to provide the heat for evaporation of a large part of the water remaining in the corn syrup. It is necessary, also, that the rate of movement of the syrup over the heated surface, such as coil 2, be extremely rapid for reasons that have been given.

The pump 6 used for delivering the material to the conveyor belt may be of a standard kind adapted to remove a warm viscous material under high vacuum, and to prevent such serious leakage of air inward as to break the vacuum in chamber 4.

There has been used to advantage a gear pump with line to the pump and the pump itself steam-jacketed. In place of the pump there may be used a warm-water-jacketed barometric leg of usual kind receiving material from the bottom of chamber 4 and delivering it upon the conveyor belt.

The syrup to be brought against the heated surface, such as the interior of coil 2, should be concentrated to a viscous condition, the higher the concentration the better for the present purposes so long as the syrup remains flowable and has not been exposed during its preconcentration in batch evaporation to a temperature so high as to introduce seriously objectionable changes in the quality of the syrup.

For such concentrated syrups one passage of the syrup through the system by the method described is ordinarily adequate to give the desired drying. If, however, an abnormally large proportion of water is to be evaporated, because of the original low concentration of the syrup charged or because of a particularly high degree of dryness desired in the finished product, then the passage of the syrup through the system may be repeated. For this purpose, the material discharged through line 7 may be diverted through the pipe 14 to the intake to pump 15 which, in turn, delivers the material through the coil 2 to the vacuum chamber 4, suitable valves being used as at positions indicated in the drawing.

The cycle may be repeated as many times as desired or as necessary to obtain a specified low content of water. The dried material is finally delivered to the conveyor 8 or to other suitable means for cooling a solidifiable mass of starch conversion products.

Syrups of various degrees of conversion may be used in our method and apparatus, as, for example 26 D. E. to 80 D. E., D. E. being the abbreviation for dextrose equivalent by which is meant the percentage of reducing sugars calculated as dextrose. In general, high degrees of conversion are preferred; with high conversions, the original concentration in the batch evaporator may be carried to a somewhat lower water content than with syrups of lower degree of conversion.

The pressure of steam upon and around the coil 2 may be varied, say, from 100 to 500 pounds, to give the desired temperature to the syrup within the coil.

Parts of the apparatus for handling material that has passed through the coil are advantageously steam-jacketed or hot-water-jacketed, as illustrated in the drawing in connection with the chamber 4 and lines 7 and 14. Also the vacuum line 5 may be provided with a trap of usual type as shown.

A satisfactory diameter of the pipe of coil 2 is one of the order of 1½ to 2 inches or so. In general, the pipe size is so proportioned to the rate of feed from pump 15 as to make certain a high rate of movement of the syrup through the coil.

In place of the coil 2, there may be used other conventional means for imparting a high temperature to a liquid moving therethrough, as, for example, a long tube evaporator in which the syrup to be dried is passed through the tubes and high pressure steam is admitted around the tubes.

With the apparatus shown in Fig. 2, the same general conditions are utilized and the same results obtained as described previously in connection with Fig. 1.

In Fig. 2 there are shown a syrup inlet to a heat exchanger 17 containing a number of long tubes of small diameter arranged in parallel and shown by the broken lines. The syrup passes downward through the plurality of small tubes. Steam for heating the syrup enters the vessel 17 and bathes the outside of the series of parallel tubes.

The syrup thus heated issues from the lower end of the several tubes into the vacuum flash chamber 18 provided with a line 19 leading to a water filled barometric leg or to a vacuum pump.

At its lower end, the vacuum chamber is connected with the discharge line 20 through which the dewatered syrup in flowable condition passes to pump 21. The pump delivers the material, still in flowable condition, through discharge line 22 to the upper reach of a cooling belt 23 which is suitably enclosed in a housing 24 into which cold air is blown through inlets 25.

The dewatered syrup is solidified by this chilling and is finally discharged through the outlet 26 including suitably a scraper part for removing the solidified material from the conveyor belt.

The vacuum chamber 18, line 20, pump 21, and discharge pipe 22 are steam jacketed as shown, so that the dewatered syrup is maintained at a temperature above its solidification point until delivered to the chilling belt.

While various dimensions may be used, it is convenient to have the tower 17 rather tall as, for instance, of such dimensions that the parallel tubes therewithin may each be about 40 feet long.

Also the line 20 is suitably moderately long. This line during operation of the method is filled practically continuously with the pasty but flowable mass of dewatered syrup. The weight of this column offsets in part the vacuum or pull of the barometric leg through line 19. It has been found that the pump 21 operates more smoothly when line 20 is 10 feet or so long, this 10 feet of rather heavy liquid (specific gravity of 1.5) offsetting roughly half or more of the vacuum against which the pump must otherwise pull the dewatered syrup.

Temperatures used are as described above. In a typical operation using the equipment of Fig. 2, the syrup is delivered to the top of the parallel series of tubes in member 17 at a temperature of about 225° F. and a density of 43° Bé. If syrup of lower density than about 42° to 43° Bé. is used, there is an unnecessary load on the equipment in effecting evaporation that may be made more economically up to about 42° to 43° in conventional vacuum evaporators. If the density is much above 42° to 43° Bé. the syrup can not be pumped readily, even when warm. When there is no important objection to a decrease in the capacity of the equipment, the syrup may be replaced by liquor made by usual refining and evaporation of starch-conversion liquor to a density of 30° Bé. or above but below that of the syrup referred to.

Member 17 is heated by steam admitted around the tubes therein at a pressure of about 100 pounds, the steam condensate being discharged from an outlet at the bottom of the exchanger 17 as shown. The syrup moves downwardly through the tubes at high velocity. These tubes heat the syrup uniformly and adequately but without objectionable local overheating at any point. The heated syrup is discharged from the vacuum chamber 18 to the pump and from the pump to the cooling belt at a temperature of about 250° F. and a moisture content of about 1 to 4%.

Maintenance of the temperature up to the point of discharge on the chilling belt is important. If the temperature of the dewatered material in advance of this point is allowed to drop substantially, say to 200° F. or below, the syrup becomes so thick that it cannot be pumped readily or may actually solidify, particularly at very low percentages of moisture such as 1 to 2 per cent.

It will be understood that the details given are for the purpose of illustration and that variations within the spirit of the invention are intended to be included within the scope of the appended claims.

What is claimed is:

1. In making dried starch conversion syrup solids, the method which comprises evaporating starch conversion liquor, of reducing sugars content calculated as dextrose of 26 to 80%, to a heavy liquor of density not less than 30° Bé. and not above that density at which the liquor when warm may be pumped, heating the thus concentrated liquor to a temperature of about 250° to 350° F. by causing it to flow rapidly over steam heated surfaces maintained at a temperature substantially above the temperature to which the syrup is to be heated, discharging the thus treated syrup continuously into an evacuated heated chamber so that quick evaporation of water from the heated syrup occurs and the water content is lowered to an amount not exceeding approximately 4%, maintaining the product after said evaporation at a temperature above the flow point thereof, withdrawing the resulting product in flowable form from the evacuated chamber, maintaining the product during the said withdrawing from the evacuated chamber at a temperature above the solidification point of the said product, so that it remains flowable, and then cooling the resulting material to cause solidification thereof, the method giving quickly a solidified syrup characterized by minimized development of both discoloration and objectionable flavor.

2. In making dried starch conversion syrup solids, the method which comprises evaporating starch conversion syrup, of reducing sugars content calculated as dextrose of about 26 to 80 per cent, to a concentration corresponding to a density not substantially less than 42° Bé. or above that at which the syrup may be pumped, heating the thus concentrated syrup to a temperature of about 250° to 350° F. by forcing it rapidly over steam heated surfaces maintained at a temperature substantially above the temperature to which the syrup is to be heated, discharging the thus treated syrup continuously into an evacuated heated chamber so that quick evaporation of water from the heated syrup occurs and the water content is lowered to an amount not exceeding approximately 3%, maintaining the product after said evaporation at a temperature above the flow point thereof, withdrawing the resulting product in liquid form from the evacuated chamber, heating the product during the said withdrawing from the evacuated chamber so as to maintain the temperature above the solidification point of the said product, then forming the withdrawn material into a layer, and cooling the said layer by contact with air, the method giving quickly a solidified syrup characterized by minimized development of both discoloration and objectionable flavor.

3. The method described in claim 2, the syrup being moved over the said steam heated surfaces at a linear speed at least of the order of 15 feet a second.

4. In making dried starch conversion syrup solids, the method which comprises heating the starch conversion liquor of reducing sugars content calculated as dextrose of about 26 to 80 D. E. to a temperature from 180° to 220° F. to form a liquor of density not less than 30° Bé. and not above that density at which the liquor when warm may be pumped, pumping the thus concentrated liquor through a zone of confined area the surfaces of which are heated to a temperature above 350° F. causing the liquor to flow through such area at a speed of at least 15 feet per second and continuing the liquor in contact with such surfaces for sufficient time so that its temperature is raised to a point between 250° and 350° F., discharging the thus treated syrup continuously into an evacuated heated chamber so that quick evaporation of water from the heated syrup occurs and the water content is lowered to an amount not exceeding approximately 4% and low enough so that the same will solidify rapidly when chilled, maintaining the product after said evaporation at a temperature above the flow point thereof, withdrawing the resulting product in flowable form from the evacuated chamber, maintaining the product during the said withdrawing from the evacuated chamber at a temperature above the solidification point of the said product so that it remains flowable, and then rapidly cooling the resulting material while in motion to cause solidification thereof, the method giving quickly and continuously a solidified syrup characterized by minimized development of both discoloration and objectionable flavor.

HERMAN H. SCHOPMEYER.
FRED J. HAMMERSTEIN.
GENERAL W. LARMOUTH.

REFERENCES CITED

The following references are of record in the file of this patent:

UNITED STATES PATENTS

| Number | Name | Date |
|---|---|---|
| 538,387 | Schicht | Apr. 30, 1895 |
| 997,502 | Kestner | July 11, 1911 |
| 997,503 | Kestner | July 11, 1911 |
| 999,707 | Ellis | Aug. 1, 1911 |
| 1,322,875 | Buhl | Nov. 25, 1919 |
| 1,735,980 | Sadtler | Nov. 19, 1929 |
| 2,142,984 | Thurman | Jan. 3, 1939 |
| 2,189,824 | Walsh | Feb. 13, 1940 |

Certificate of Correction

Patent No. 2,429,964.                                                                                 October 28, 1947.

HERMAN H. SCHOPMEYER ET AL.

It is hereby certified that error appears in the printed specification of the above numbered patent requiring correction as follows: Column 6, line 26, beginning with "1. In making" strike out all to and including the word and period "flavor." in column 7, line 8, comprising claims 1 and 2, and insert instead the following:

1. In making dried starch conversion syrup solids, the method which comprises heating starch conversion liquor, of reducing sugars content calculated as dextrose of 26 to 80 D. E., to form a liquor of density not less than 30° Bé. and not above that density at which the liquor when warm may be pumped, heating the thus concentrated liquor to a temperature of about 250° to 350° F. by causing it to flow at a speed of at least 15 feet per second over steam heated surfaces of a zone of confined area maintained at a temperature substantially above the temperature to which the syrup is to be heated and of sufficient length to heat the syrup to the temperature specified, discharging the thus treated syrup continuously into an evacuated heated chamber so that quick evaporation of water from the heated syrup occurs and the water content is lowered to an amount not exceeding approximately 4%, maintaining the product after said evaporation at a temperature above the flow point thereof, withdrawing the resulting product in flowable form from the evacuated chamber, maintaining the product during the said withdrawing from the evacuated chamber at a temperature above the solidification point of the said product, so that it remains flowable, and then cooling the resulting material to cause solidification thereof, the method giving quickly a solidified syrup characterized by minimized development of both discoloration and objectionable flavor.

2. In making dried starch conversion syrup solids, the method which comprises heating starch conversion syrup, of reducing sugars content calculated as dextrose of about 26 to 80 D. E., to a temperature of between 180° and 220° F. until it reaches a concentration corresponding to a density not substantially less than 42° Bé. but not above the concentration at which the syrup may be pumped, heating the thus concentrated syrup to a temperature of about 250° to 350° F. by forcing it at a speed of at least 15 feet per second over steam heated surfaces of a zone of confined area maintained at a temperature substantially above the temperature to which the syrup is to be heated and of sufficient length to heat the syrup to the temperature specified, discharging the thus treated syrup continuously into an evacuated heated chamber so that quick evaporation of water from the heated syrup occurs and the water content is lowered to an amount not exceeding approximately 3%, maintaining the product after said evaporation at a temperature above the flow point thereof, withdrawing the resulting product in liquid form from the evacuated chamber, heating the product during the said withdrawing from the evacuated chamber so as to maintain the temperature above the solidification point of the said product, then forming the withdrawn material into a layer, and cooling the said layer by contact with air, the method giving quickly a solidified syrup characterized by minimized development of both discoloration and objectionable flavor.

and that the said Letters Patent should be read with this correction therein that the same may conform to the record of the case in the Patent Office.

Signed and sealed this 23rd day of March, A. D. 1948.

[SEAL]

THOMAS F. MURPHY,
*Assistant Commissioner of Patents.*